United States Patent
Endrikhovski et al.

(10) Patent No.: US 8,131,263 B2
(45) Date of Patent: Mar. 6, 2012

(54) BACKUP MEDIA WITH WIRELESS IDENTIFICATIONS TAGS

(75) Inventors: Serguei N. Endrikhovski, Bellevue, WA (US); Paul Michel Elrif, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 419 days.

(21) Appl. No.: 11/634,690

(22) Filed: Dec. 6, 2006

(65) Prior Publication Data

US 2008/0136648 A1    Jun. 12, 2008

(51) Int. Cl.
  *H04L 12/58* (2006.01)
  *G08B 13/14* (2006.01)
  *G11B 15/68* (2006.01)
  *G06F 3/00* (2006.01)

(52) U.S. Cl. ............... 455/412.1; 340/572.7; 340/572.8; 340/10.5; 360/92.1; 360/132; 719/310

(58) Field of Classification Search ......... 340/10.1–10.3
See application file for complete search history.

(56) References Cited

U.S. PATENT DOCUMENTS

| | | | |
|---|---|---|---|
| 5,920,261 A * | 7/1999 | Hughes et al. | 340/568.8 |
| 6,201,474 B1 * | 3/2001 | Brady et al. | 340/572.8 |
| 6,226,688 B1 * | 5/2001 | Frary | 719/310 |
| 6,304,416 B1 * | 10/2001 | McAllister et al. | 360/132 |
| 6,480,100 B1 | 11/2002 | Frieden et al. | |
| 6,870,797 B2 | 3/2005 | Reasoner et al. | |
| 6,902,111 B2 | 6/2005 | Han et al. | |
| 7,038,985 B2 | 5/2006 | Ryal | |
| 7,327,264 B1 * | 2/2008 | Mitchell et al. | 340/572.7 |
| 2002/0125321 A1 * | 9/2002 | Reasoner et al. | 235/462.25 |
| 2003/0069815 A1 * | 4/2003 | Eisenberg et al. | 705/32 |
| 2004/0036595 A1 * | 2/2004 | Kenny et al. | 340/505 |
| 2004/0047247 A1 * | 3/2004 | Johnson et al. | 369/30.36 |
| 2004/0158549 A1 | 8/2004 | Matena et al. | |
| 2004/0202061 A1 * | 10/2004 | Reasoner et al. | 369/30.36 |
| 2004/0264441 A1 | 12/2004 | Jalkanen et al. | |
| 2005/0133583 A1 | 6/2005 | Tada | |
| 2005/0166010 A1 | 7/2005 | Martin | |
| 2005/0212660 A1 * | 9/2005 | Hansen et al. | 340/10.3 |

(Continued)

FOREIGN PATENT DOCUMENTS

WO     2006032613 A2    3/2006

OTHER PUBLICATIONS

Bumbak, Matija, "RFID and Security", Date: May 2005, http://dexus.amaze.n1/~rfidweblog/docs/Bumbak_thesis_RFID%20and%20security.pdf.

(Continued)

*Primary Examiner* — Jinsong Hu
*Assistant Examiner* — William Nealon (57) ABSTRACT

Aspects of the subject matter described herein relate to using wireless identification tags (e.g., RFID tags) with backup media. In aspects, a wireless identification tag may be attached to, incorporated into, or otherwise associated with backup media, a container holding the backup media, or a location (e.g., a shelf) associated with the backup media. In response to a signal, this wireless identification tag may provide an identifier that uniquely identifies the wireless identification tag. This identifier may be associated with a data set that is stored or to be stored on the backup media. The wireless identification tag may be used to locate the backup media and to identify what is on particular backup media. In some embodiments, the wireless identification tag may store backup information thereon that may be subsequently retrieved and used identify what is on its associated backup media.

19 Claims, 6 Drawing Sheets

U.S. PATENT DOCUMENTS

| | | | |
|---|---|---|---|
| 2005/0212676 A1* | 9/2005 | Steinberg | 340/572.8 |
| 2005/0242188 A1* | 11/2005 | Vesuna | 235/462.46 |
| 2006/0028352 A1* | 2/2006 | McNamara et al. | 340/825.49 |
| 2006/0044111 A1* | 3/2006 | Kollar et al. | 340/10.1 |
| 2006/0108411 A1 | 5/2006 | Macurek et al. | |
| 2006/0132309 A1 | 6/2006 | Posamentier | |
| 2006/0181400 A1 | 8/2006 | Cox et al. | |
| 2007/0055686 A1* | 3/2007 | Findlay et al. | 707/102 |

OTHER PUBLICATIONS

De et al., "An RFID Based Technique for Handling Object Distribution and Recalls in Pervasive Transaction Environments", http://crewman.uta.edu/mug/Publications/Pradip/mass.pdf.

Lee et al., "Software architecture for a multi-protocol RFID reader on mobile devices", Date: 2005, http://ieeexplore.ieee.org/iel5/10706/33796/01609861.pdf?isNumber=.

Niranjan et al., "REALMS—RFID Enabled Animated Space", http://dawn.cs.umbc.edu/INFOCOM2005/niranjan-abs.pdf.

Sarma et al., "RFID Systems and Security and Privacy Implications", http://citeseer.ist.psu.edu/cache/papers/cs/27175/http:zSzzSztheory.lcs.mit.eduzSz~sweiszSzches-rfid.pdf/sarma02rfid.pdf.

International Search Report and Written Opinion for International Application No. PCT/US2008/053138 dated Jan. 30, 2009, 11 pages.

* cited by examiner

BACKUP MEDIA WITH WIRELESS IDENTIFICATIONS TAGS

BACKGROUND

As an organization grows, typically, its storage needs grow. To be able to recover data in case of a catastrophe or accident, the organization may backup its data onto backup media such as tapes. Some of the backup media may be stored on-site while other backup media may be stored off-site. The backup media may be re-used, archived, erased, and destroyed at pre-selected times. Organizing, locating, and identifying the backup media, especially with large data sets, can be challenging.

SUMMARY

Briefly, aspects of the subject matter described herein relate to using wireless identification tags (e.g., RFID tags) with backup media. In aspects, a wireless identification tag may be attached to, incorporated into, or otherwise associated with backup media, a container holding the backup media, or a location (e.g., a shelf, box, cabinet, or large room) associated with the backup media. In response to a signal, this wireless identification tag may provide an identifier that uniquely identifies the wireless identification tag. This identifier may be associated with a data set that is stored or to be stored on the backup media. The wireless identification tag may be used to locate the backup media and to identify what is on particular backup media. In some embodiments, the wireless identification tag may store backup information thereon that may be subsequently retrieved and used identify what is on its associated backup media.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Exemplary Operating Environment

Figure 1:
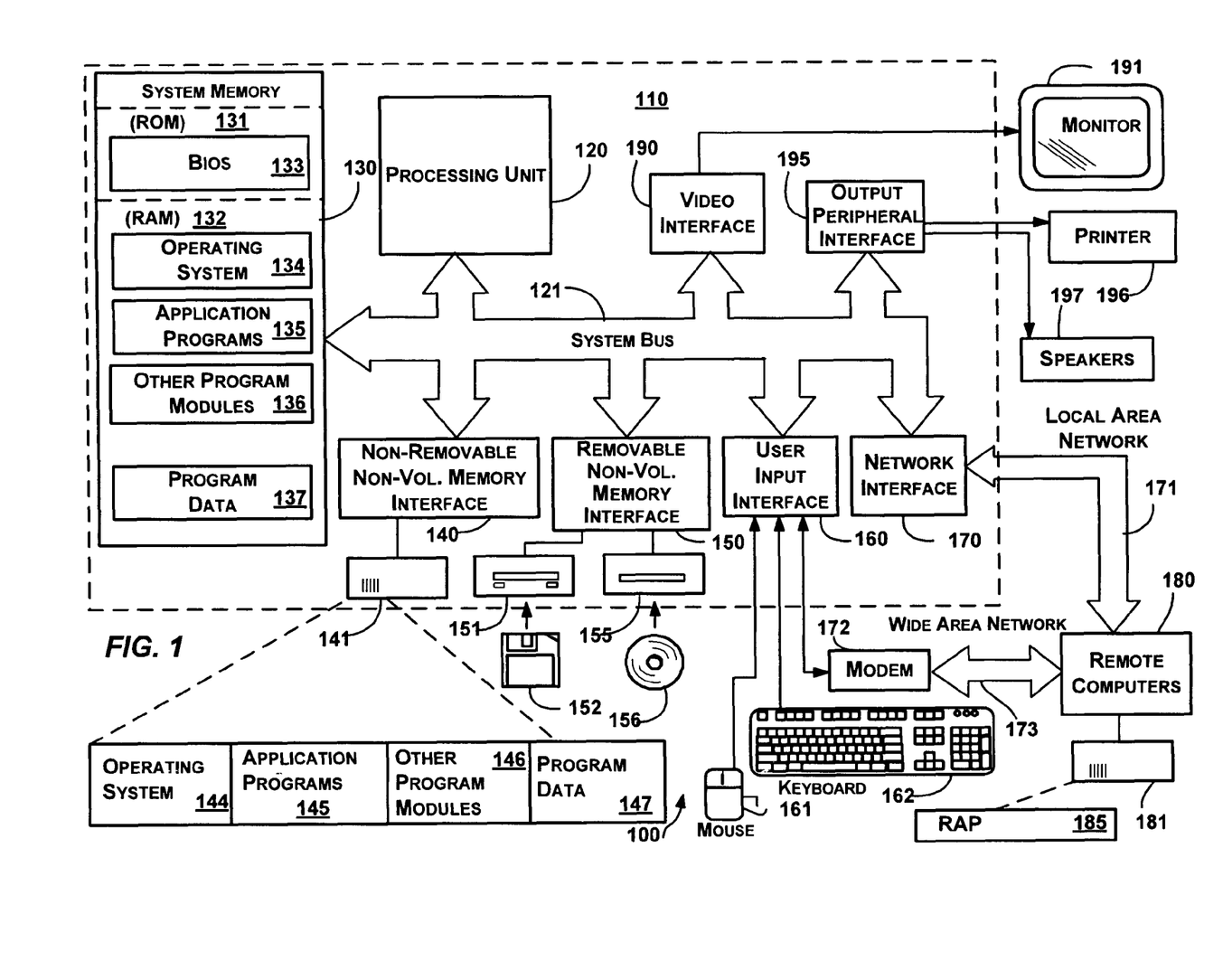
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, microwave, infrared, and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Wireless Identification Tags

Figure 2:
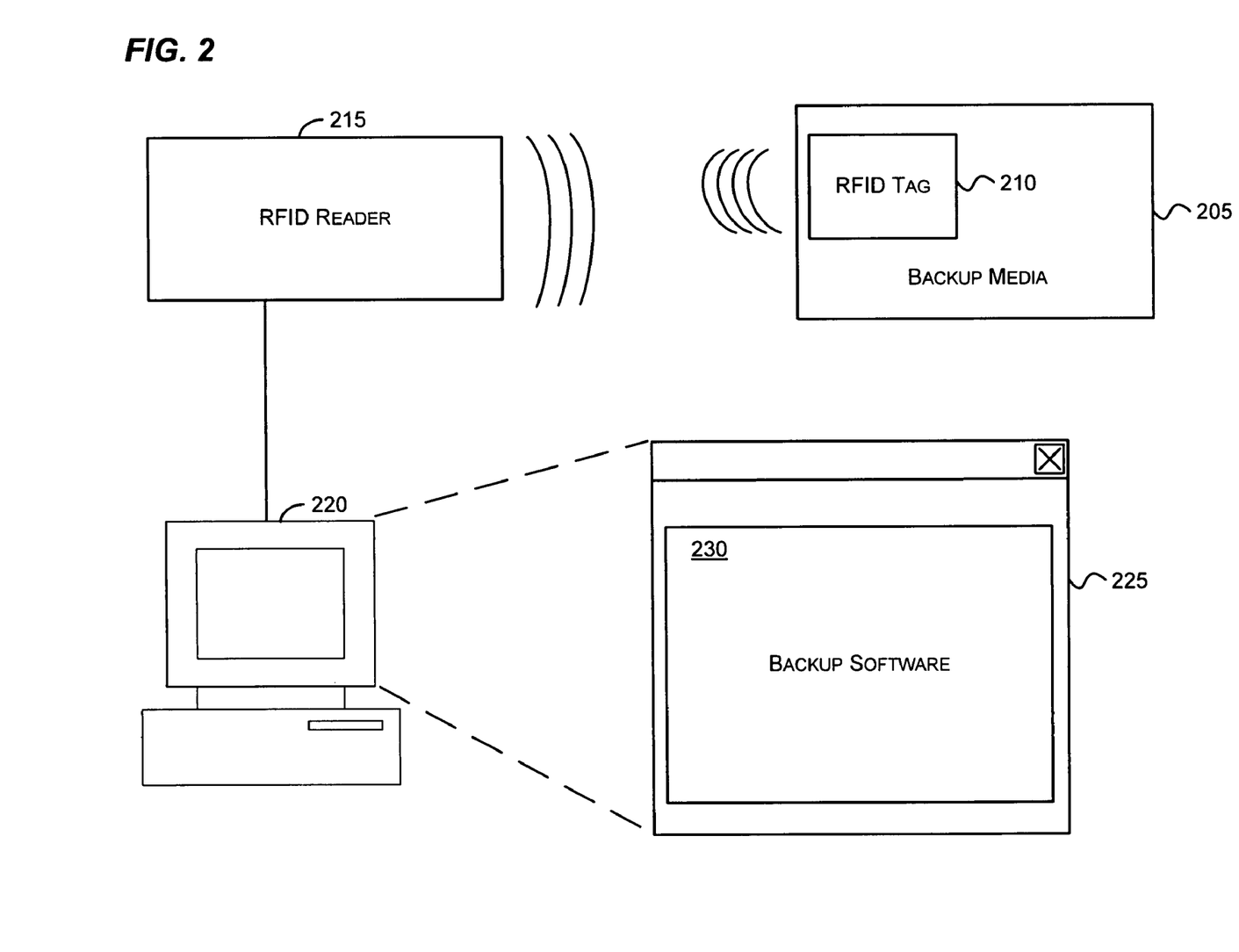
FIG. 2 is a diagram of an exemplary system in which aspects of the subject matter described herein may operate.

FIG. 2 is a diagram of an exemplary system in which aspects of the subject matter described herein may operate. The system includes a backup media 205 for storing backup files. The backup media 205 may be formed using various known data storing technologies such as tape, CD, DVD, hard drives, other storage media mentioned above in conjunction with FIG. 1, and the like.

A Radio Frequency Identification (RFID) tag 210 is an object that may be attached to, incorporated into, or otherwise placed in or on a backup media or its package. In one embodiment, RFID tags may be located on storage shelves, file cabinets, boxes, other locations, and the like associated with the backup media. In another embodiment, RFID tags may be embedded into the backup media. For example, an RFID tag may be embedded into plastic near the central portion of a CD or DVD disk, into a tape, hard drive, flash memory, or some other backup media.

The RFID tag 210 may communicate via radio waves. In an embodiment, the RFID tag 210 may include a silicon chip and one or more antennas to enable it to receive and respond to radio-frequency communications from an RFID reader 215. In another embodiment, the RFID tag 210 may include a polymer semiconductor that has one or more antennas to enable it to receive and respond to the RFID reader 215. It will be recognized that any tag capable of receiving a communication from an RFID reader and responding to the communication may be used without departing from the spirit or scope of aspects of the subject matter described herein.

The RFID tag 210 may utilize passive, semi-passive, or active technologies. Passive RFID tags have no internal power supply. Passive tags may have practical read distances ranging from about 10 cm up to a few meters depending on the chosen radio frequency and antenna design/size. Semi-passive RFID tags are very similar to passive tags except for the addition of a small battery. Active RFID tags have their own power source which is used to power any integrated circuits that generate the outgoing signal. Active tags may be much more reliable (e.g. fewer errors) than passive tags due to the ability for active tags to conduct a "session" with a reader. Active tags may also have a much longer range (approximately 300 feet) and larger memories than passive tags, as well as the ability to store additional information. RFID tags may offer at least three types of functionality: read only, write-once/read-many, and write-many/read-many.

When an RFID tag includes read only capability, the RFID tag may respond to queries with its ID. The ID of the RFID tag may be hard-coded into the RFID tag.

When an RFID tag includes write capabilities, backup information may be stored on and retrieved from the RFID tag. Depending on the storage available on the RFID tag, the backup information may include date and time of backup, name of backup set, name of backup file, size of backup files, a retention policy, a destruction/recycle date, ownership information, machine name, whether the backup is a full or incremental backup, whether the backup is an archive, whether the backup is encrypted a combination of the above, and the like. The information stored in the RFID tag may itself be encrypted. The RFID tag may communicate the information it stores in response to particular requests.

The RFID reader 215 communicates with the RFID tag 210 by emitting electromagnetic waves through air. The reader 215 has one or more antennas, which emit radio waves and receive signals back from the RFID tag 210. The RFID reader 215 may be a special purpose device such as an RFID transceiver, or a general purpose device such as a personal digital assistant (PDA) or cell phone with RFID capabilities. In an embodiment, the RFID Reader 215 may be integrated into a "smart phone" such as the Nokia 5140 by using the Nokia Mobile RFID Kit.

The RFID reader 215 may communicate with the computer 220 through either a wired or wireless connection. In one embodiment, the connection may include a cable employing a common interface, such as a Universal Serial Bus (USB) interface, the IEEE 1394 interface, or some other interface. In another embodiment, the connection may employ a wireless interface. One exemplary interface is described by the Bluetooth specification. Other exemplary interfaces include those defined by IEEE 802.15. Yet other embodiments may include interfaces having other or proprietary formats and protocols.

The computer 220 may include an operating system and backup software 230, which may be operated by a user. The operating system and the backup software 230 may interface with the user through one or more or screens or windows 225. In one embodiment, the operating system is Windows® Server 2003 and the backup software 230 is Windows® Backup and Restore produced by Microsoft Corporation of Redmond, Wash. In other embodiments, the operating system may be Linux, Unix, Mac OS, a different Windows® operating system, or another operating system. In other embodiments, the backup software may be one produced by NetMass, Novastor, EMC, Symantec, or some other vendor. The backup software 230 performs a backup process and stores backup files as well as the identification information from the RFID tag 210.

In an embodiment, the RFID reader 215 may be able to determine the strength of the signal provided by an RFID tag. This may be used, for example, to guide a user carrying the RFID reader 215 to desired backup media. For example, if the user is looking for backup media associated with a particular RFID tag, the user (or the computer 220) may indicate this to the RFID reader 215. As the user gets closer to the RFID tag, the RFID reader 215 may indicate that the user is getting closer. This may be done, for example, through a display included with the RFID reader 215, through a flashing light or other indicator included on the RFID reader 215, through sound, or otherwise without departing from aspects of the subject matter described herein.

In an embodiment, there may be multiple RFID readers. One or more RFID readers may be stationed near an entry/exit. When RFID tags associated with backup media pass the RFID readers, the RFID readers may determine whether the backup media is being taken off-site or brought back on-site. This information may be passed to the backup software 225 which may track where the backup media is. Other RFID readers (such as the RFID reader 215) may be used to locate the backup media on-site, for example.

Multiple RFID readers may also be used to triangulate a position of an RFID tag. If this position is overlaid with a map of media storage, it may be used to determine a position of the RFID tag 210 and hence the backup media 205. One or more RFID readers may determine a direction of an RFID tag based on signal strength, incoming signal direction, or other indicators. In an embodiment, the RFID reader 215 may have a visible calibration direction indicator. For example, the RFID reader 215 may include a laser pointer that points in the direction of the RFID tag. This calibration direction indicator may be used, for example, to find backup media with better speed and precision.

Figure 3A:
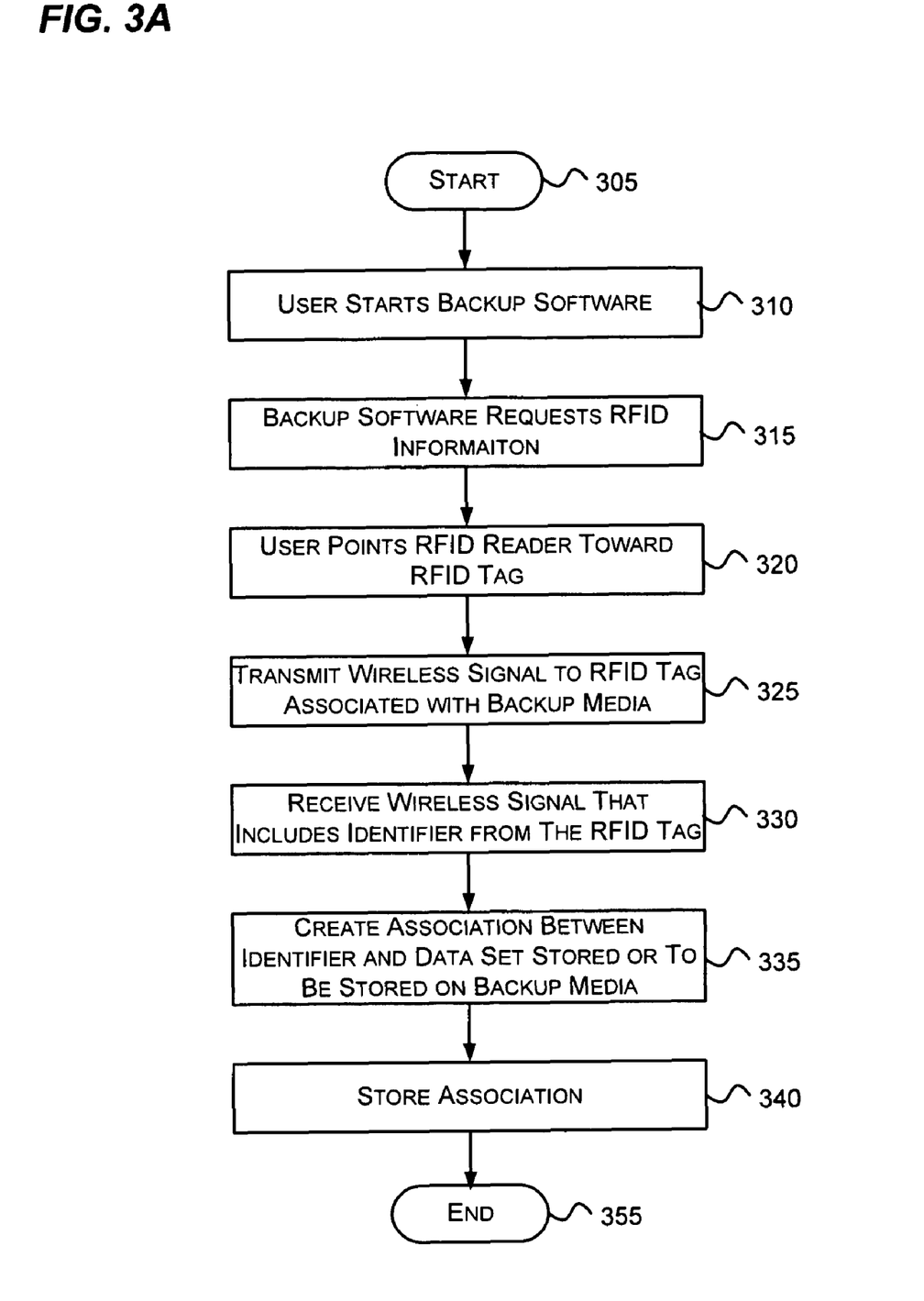
FIG. 3A is a flow diagram that generally represents exemplary actions that may occur in associating a passive RFID tag with a backup data set according to aspects of the subject matter described herein.

FIG. 3A is a flow diagram that generally represents exemplary actions that may occur in associating a passive RFID tag with a backup data set according to aspects of the subject matter described herein. At block 305, the actions begin.

At block 310, a user may start backup software. At block 315, the backup software requests RFID information from the user. This request may come before or after completing the backup process. At block 320, the user points the RFID reader toward an RFID tag. As mentioned previously, the RFID tag may be attached to or incorporated in the backup media, its packaging, or on some object associated with the backup media. This attachment or incorporation is sometimes referred to as being "associated with" the backup media. In one embodiment, the user attaches the RFID tag to the backup media. In other embodiments, the RFID tag is attached by a producer or vendor of the backup media.

In an embodiment, an RFID tag may be associated with a backup media without being attached to or incorporated in the backup media its packaging, or on some object associated with the backup media. For example, a user may have a box of RFID tags. The user may pull an RFID tag out of the box and temporarily associate it with a data set or backup media. After the user no longer needs the association, the user may put the RFID tag back in the box for reuse.

At block 325, the RFID reader transmits a wireless signal to an RFID tag associated with backup media. For example, referring to FIG. 2, the RFID reader 215 transmits a wireless signal to the RFID tag 210 associated with the backup media 205.

At block 330, the RFID reader receives a wireless signal from the RFID tag that includes an identifier. This identifier may be an identifier that is unique to the RFID tag. For example, referring to FIG. 2, the RFID tag 210 may transmit a wireless signal to the RFID reader 215. This wireless signal may include an identifier of the RFID tag 210.

At block 335, an association is created between the identifier and a data set stored or to be stored on the backup media. The association may include the RFID identifier and an identifier uniquely representing the data set.

At block 340, the association is stored for subsequent identification of the data set in response to subsequently receiving the identifier. For example, referring to FIG. 2, the backup software 230 may store this association in a database or other data store. When the backup software 230 receives a request for the backup media associated with a particular data set, the backup software 230 may then look up the RFID identifier by retrieving the association. When the backup software 230 receives a request for the data set associated with the RFID identifier, the backup software may also find this by retrieving the association.

At block 355, the actions end.

Figure 3B:
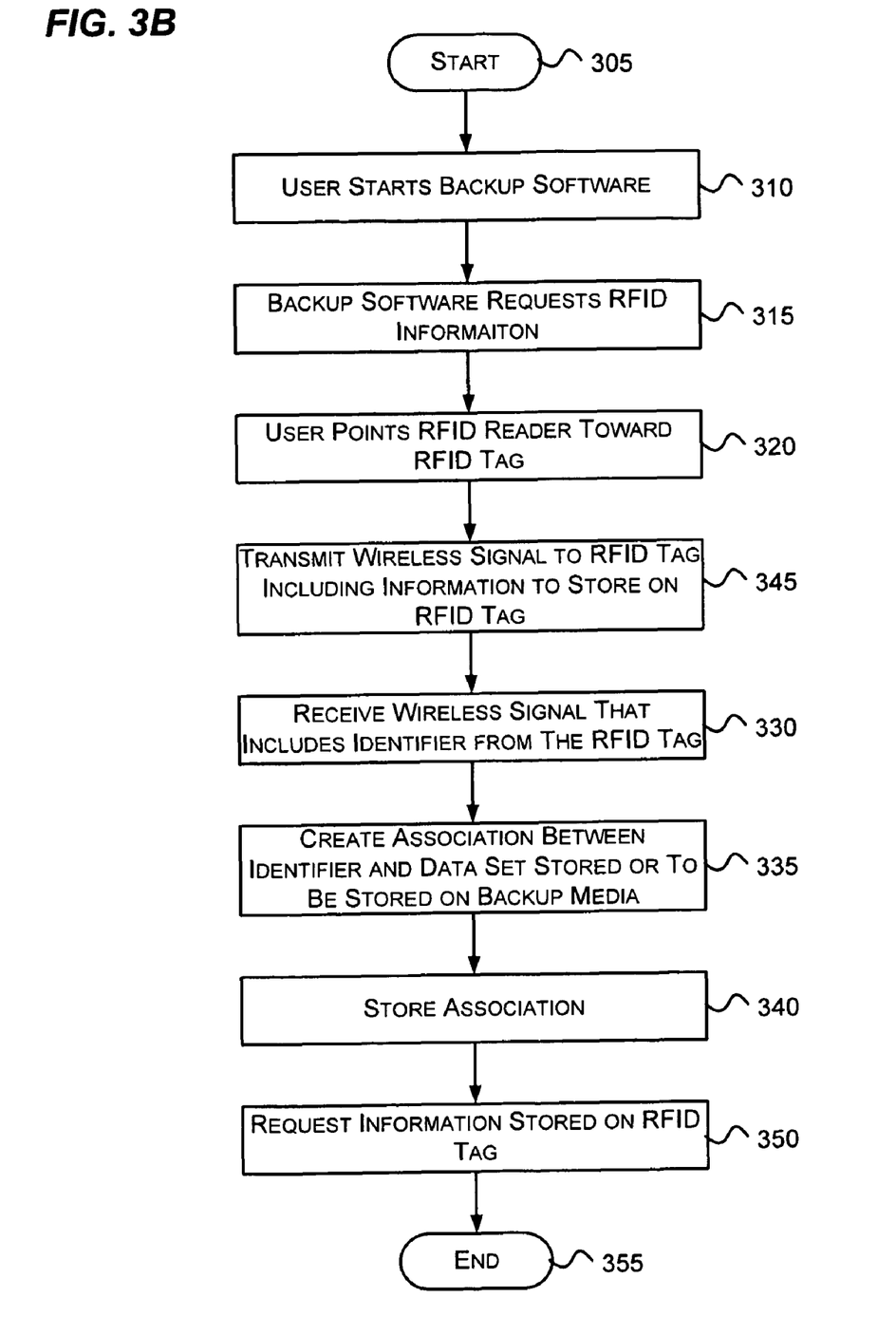
FIG. 3B is a flow diagram that generally represents exemplary actions that may occur in associating an active RFID tag with a backup data set according to aspects of the subject matter described herein.

FIG. 3B is a flow diagram that generally represents exemplary actions that may occur in associating an active RFID tag with a backup data set according to aspects of the subject matter described herein. The actions associated with blocks 305-340 are the same as those described above in conjunction with identical numbered blocks in FIG. 3A.

At block 345, the RFID reader may transmit backup information to store on the RFID tag. Some examples of what might be included in this information have been described previously. In response to this transmission, the RFID tag may store the information in its memory.

At block 350, the RFID reader may request part or all of the information regarding the data set from the RFID tag. In response, the RFID tag retrieves and sends the requested information. In one embodiment, the RFID tag returns all available information each time it receives a signal from an RFID reader. In other embodiments, the RFID tag may return a portion of the available information depending on the request.

At block 355, the actions end.

Figure 4:
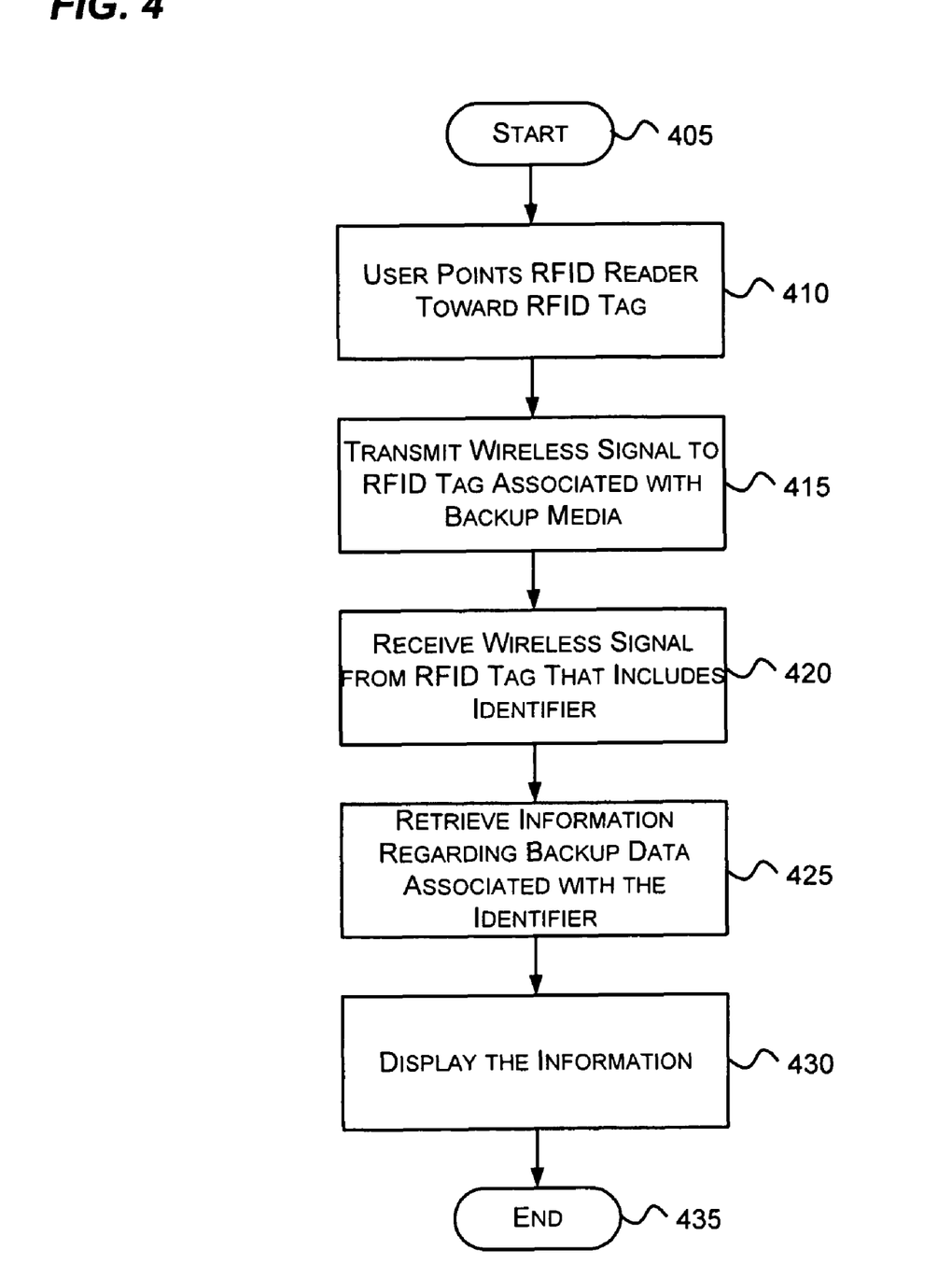
FIG. 4 is a flow diagram that generally represents exemplary actions that may occur in retrieving information about data included on backup media associated with an RFID tag according to aspects of the subject matter described herein.

FIG. 4 is a flow diagram that generally represents exemplary actions that may occur in retrieving information about data included on backup media associated with an RFID tag according to aspects of the subject matter described herein. At block 405, the actions begin.

At block 410, the user points an RFID reader toward an RFID tag. At block 415, the RFID reader transmits a wireless signal to an RFID tag associated with backup media. For example, referring to FIG. 2, the RFID read 215 transmits a wireless signal to the RFID tag 210 associated with the backup media 205.

At block 420, the RFID reader receives a wireless signal from the RFID tag that includes an identifier. For example, referring to FIG. 2, the RFID tag 210 may transmit a wireless signal to the RFID reader 215. At block 425, information regarding the backup data associated with the identifier is retrieved. In one embodiment, this information is retrieved by using the identifier just received to look up the information in a database or other store. In another embodiment, the information is retrieved by transmitting another wireless signal to the RFID tag and requesting additional information. As mentioned previously, RFID tags that have write capability may also store information about a backup. This information may be retrieved by an RFID reader after it has been stored on an RFID tag. In yet another embodiment, a combination of retrieving information from the RFID tag and retrieving information from a local database may be used to obtain information regarding the backup data stored on the backup media.

In some embodiments, an RFID tag may be able to respond with either 1) its identifier or other information stored thereon, or 2) both its identifier and the other information stored thereon. Furthermore, in some embodiments, an RFID tag may not be able to return partial information (e.g., some of the other information). In an embodiment in which the RFID tag responds to a RFID reader with both its identifier and the other information stored thereon, the wireless signal received at block 420 includes all information stored on the RFID tag. In this embodiment, the actions associated with block 425 may comprise obtaining this information from the wireless signal received at block 420.

In an embodiment in which the RFID tag can respond with either its identifier or with the other information stored thereon, an RFID reader may send two wireless signals to the RFID tag. In the first signal (e.g., block 415), the RFID reader may ask for the identifier of the RFID tag. In the second signal (e.g., transmitted at block 425), the RFID reader may send the identifier and ask for the other information stored on the RFID tag. RFID tags that receive the second signal may use the identifier to determine whether to transmit their other information. In response to the second signal normally only one RFID tag will respond to the second signal. Two or more RFID tags may respond if they are identified by the same identifier or if different types of RFID tags (e.g., ones that respond with everything to each signal and ones that will not respond if the signal includes a different identifier).

At block 430, the information is displayed. As mentioned previously, this may be done, for example, on a display associated with the RFID reader or on a computer display. In one embodiment, a folder corresponding to the backup file(s) contained on the backup media associated with the RFID tag is highlighted. In another embodiment, properties of the backup file(s) are displayed in a property panel. Other amounts of data to display and other display mechanisms may also be utilized without departing from the spirit or scope of aspects of the subject matter described herein.

At block 435, the action end.

Sometimes there may be multiple RFID tags within the range of the RFID reader. For example, a user may point an RFID reader toward a shelf that holds many backup media. The user may be searching for a particular backup media or may wish to know what is on all the backup media within the range of the RFID reader.

When there are multiple RFID tags within range of an RFID reader, the signal exchange between the RFID tags and the RFID reader may proceed in a particular way to avoid subsequent tag collision. Tag collision occurs when multiple RFID tags concurrently send a signal to the RFID reader. When tag collision occurs, the RFID reader sends a special signal (e.g., a "gap pulse"). Upon receiving this signal, each RFID tag consults a random number counter to determine the interval to wait before sending its data. Generally, each tag gets a unique number interval, and so the tags send their data at different times. Other tag collision techniques may also be used without departing from the spirit or scope of aspects of the subject matter described herein.

When the RFID reader receives responses from multiple RFID tags, additional information about the data sets associated with the RFID tags may be obtained by the approaches described above (e.g., querying the RFID tags for additional information, obtaining additional information from a local database, or a combination of both).

Figure 5:
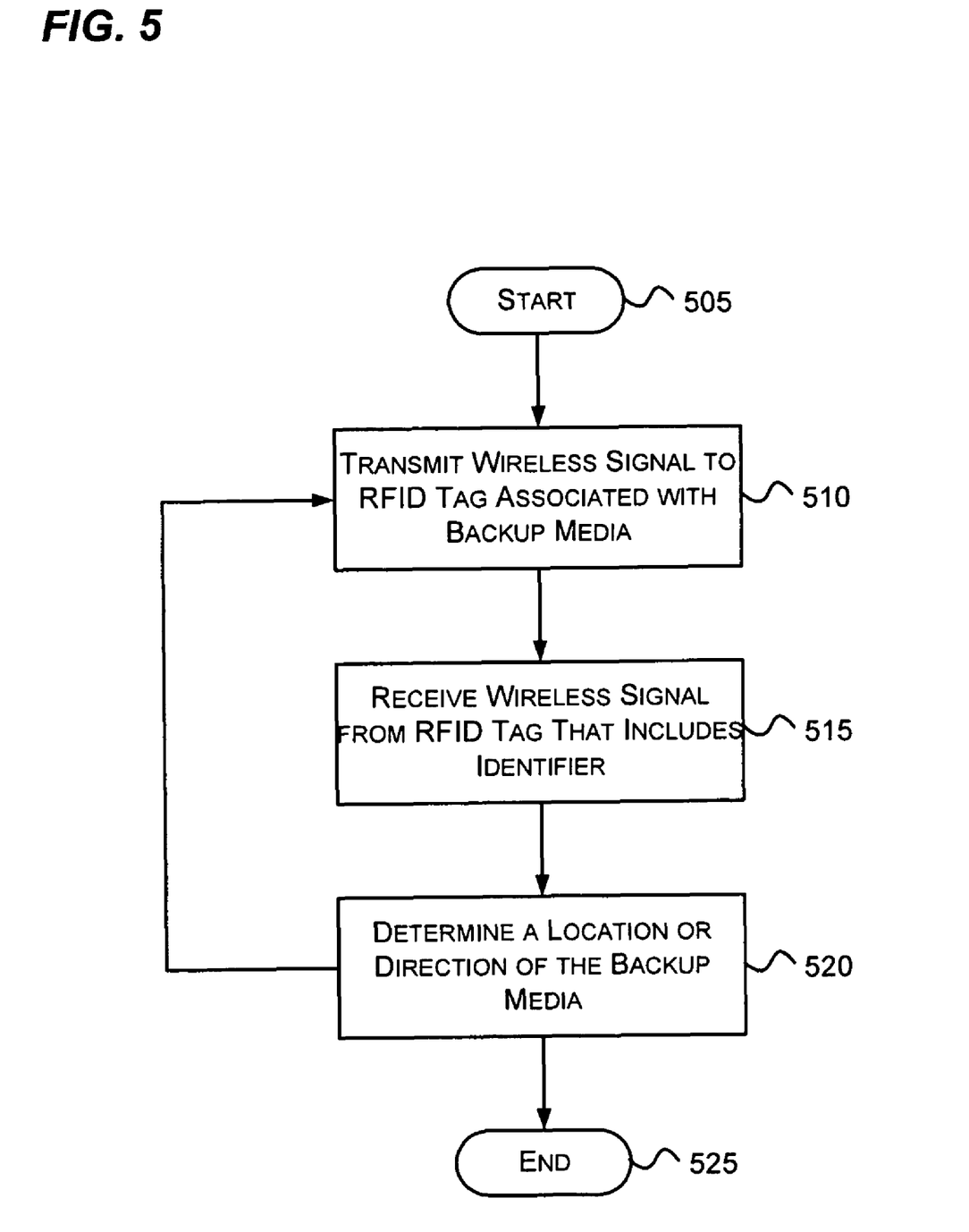
FIG. 5 is a flow diagram that generally represents exemplary actions that may occur in finding a location of backup media in accordance with aspects of the subject matter described herein.

FIG. 5 is a flow diagram that generally represents exemplary actions that may occur in finding a location of backup media in accordance with aspects of the subject matter described herein. At block 505, the actions begin.

At block 510, an RFID reader transmits a wireless signal to an RFID tag associated with backup media. As described previously, the RFID reader may be stationary (e.g., at an entry/exit or some other fixed location) or be mobile (e.g., held by a user).

At block 515, the wireless signal is received by one or more RFID readers. At block 520, a location or direction of the backup media is determined based on the received signal. This may be done as described earlier (e.g., via signal strength, triangulation, or otherwise).

After an initial direction is determined, the actions may continue at block 510 so that the precision of subsequent direction information is increased until the backup media is located.

At block 525, the actions end.

Although some of the foregoing has been described in conjunction with RFID tags, in other embodiments, electromagnetic frequencies of frequencies other than the radio frequency may be used with suitable readers and tags. Besides the frequency, these tags operate as described above with reference to RFID tags. A tag that may operate on radio and/or non-radio frequencies is sometimes referred to herein as an identification tag.

As can be seen from the foregoing detailed description, aspects have been described related to backup media and wireless identification tags. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A computer storage medium having computer-executable instructions stored thereon, which when executed perform actions, comprising:
    storing a data set as a backup data set in a backup media during a backup process;
    associating an identification tag with the backup media;
    transmitting a first wireless signal adapted to cause the identification tag associated with the backup media to generate a second wireless signal;
    receiving the second wireless signal that includes a first identifier stored in the identification tag that uniquely identifies the identification tag;
    creating an association between the first identifier and the data set in response to the first identifier being received in the second wireless signal, the association including the first identifier and a second identifier that identifies the data set;
    storing the association to facilitate a subsequent identification of whether the data set is stored on the backup media in response to subsequently receiving the identifier: and
    storing information on the identification tag, the information including a date and/or a time at which the backup data set is stored on the backup media, a name of the backup data set, a size, a machine name, and whether the backup data set is encrypted.

2. The computer storage medium of claim 1, wherein the identification tag is attached to the backup media.

3. The computer storage medium of claim 1, wherein the identification tag is attached to a container holding the backup media.

4. The computer storage medium of claim 1, wherein the identification tag is embedded in the backup media.

5. The computer storage medium of claim 1, wherein the identification tag obtains power to transmit the second wireless signal solely from the first wireless signal.

6. The computer storage medium of claim 1, wherein the identification tag obtains power to transmit the second wireless signal at least in part from a power supply connected to the identification tag.

7. The computer storage medium of claim 1, wherein said storing information on the identification tag comprises:
    transmitting a third wireless signal that contains information to store on the identification tag.

8. The computer storage medium of claim 7, wherein the information further includes one or more of:
    a name of a backup file associated with the backup set, a retention policy, a destruction/recycle date, ownership information, whether the backup set is a full or incremental backup, and whether the backup set is an archive.

9. The computer storage medium of claim 8, further comprising transmitting a fourth wireless signal to request a portion or all of the information.

10. A method implemented at least in part by a computer, the method comprising:
    storing backup data in a backup media during a backup process;
    storing an association that includes a first identifier that uniquely identifies an identification tag and a second identifier that identifies the backup data, the identification tag being associated with the backup media, the association having been stored in response to the first identifier being received from the identification tag associated with the backup media, and the association being capable of facilitating a subsequent identification of whether the backup data is stored on the backup media;
    transmitting a first wireless signal adapted to cause the identification tag to generate a second wireless signal;
    receiving the second wireless signal that includes the first identifier associated with the identification tag;
    retrieving information regarding the backup data having the second identifier associated with the first identifier, the information corresponding to at least one backup file stored in the backup media, the information including a date and/or a time at which the backup data is stored on the backup media, a name of the backup data, a size, a machine name, and whether the backup data set is encrypted; and
    displaying the information corresponding to the at least one backup file.

11. The method of claim 10, wherein retrieving information regarding the backup data having the second identifier associated with the first identifier comprises transmitting a third wireless signal to the identification tag and receiving the information in response thereto.

12. The method of claim 10, wherein retrieving information regarding the backup data having the second identifier associated with the first identifier comprises using the first identifier to retrieve the information from a data source other than the identification tag.

13. The method of claim 10, wherein displaying the information comprises displaying the information on a display of an identification reader that transmitted the first wireless signal.

14. The method of claim 10, wherein displaying the information comprises displaying the information on a computer connected to an identification reader that transmitted the first wireless signal.

15. A computer storage medium having computer-executable instructions stored thereon, which when executed perform actions, comprising:

storing backup data in a backup media during a backup process;

storing an association that includes a first identifier that uniquely identifies an identification tag and a second identifier that uniquely represents backup data, the identification tag being associated with a backup media, the association having been stored in response to the first identifier being received from the identification tag associated with the backup media, and the association being capable of facilitating a subsequent identification of whether the backup data is stored on the backup media;

storing information on the identification tag, the information including a date and/or a time at which the backup data is stored on the backup media, a name of the backup data, a size, a machine name, and whether the backup data is encrypted;

transmitting a first wireless signal adapted to cause the identification tag to generate a second wireless signal;

receiving the second wireless signal that includes the first identifier associated with the identification tag at a reader stationed near an entry/exit;

determining a location of the identification tag based at least in part on the second wireless signal; and overlaying the determined location with a map of media storage to determine a position of the backup media.

16. The computer storage medium of claim 15, wherein said determining comprises:

measuring a signal strength of the second wireless signal and indicating the signal strength.

17. The computer storage medium of claim 15, wherein said receiving comprises:

receiving the second wireless signal that includes the first identifier associated with the identification tag at two or more locations, and wherein said determining comprises:

triangulating the location based on the two or more locations.

18. The computer storage medium of claim 15, the actions further comprising:

determining a direction of the backup media; and directing a light in the direction of the backup media.

19. The computer storage medium of claim 15, wherein information included in the second wireless signal is encrypted.

\* \* \* \* \*